US011984694B2

(12) United States Patent
Tabachyn

(10) Patent No.: US 11,984,694 B2
(45) Date of Patent: May 14, 2024

(54) METHOD OF MANUFACTURING A CONTACT ELEMENT FOR MODELLING ELECTRICAL CIRCUITS

(71) Applicant: Tovarystvo Z Obmezhenoiu Vidpovidalnistiu "EDPRO" (TOV "EDPRO"), Lvivska obl. (UA)

(72) Inventor: Andrii Myroslavovych Tabachyn, Lviv (UA)

(73) Assignee: Tovarystvo Z Obmezhenoiu Vidpovidalnistiu "EDPRO" (TOV "EDPRO"), Lvivska obl. (UA)

( * ) Notice: Subject to any disclaimer, the term of this patent is extended or adjusted under 35 U.S.C. 154(b) by 458 days.

(21) Appl. No.: 17/413,799

(22) PCT Filed: Nov. 5, 2019

(86) PCT No.: PCT/UA2019/000135
§ 371 (c)(1),
(2) Date: Jun. 14, 2021

(87) PCT Pub. No.: WO2021/010927
PCT Pub. Date: Jan. 21, 2021

(65) Prior Publication Data

US 2022/0021171 A1 Jan. 20, 2022

(30) Foreign Application Priority Data

Jul. 12, 2019 (UA) .............................. u 2019 07968

(51) Int. Cl.
*H01R 43/16* (2006.01)
*H01R 11/30* (2006.01)
*H01R 43/24* (2006.01)

(52) U.S. Cl.
CPC ............ *H01R 43/16* (2013.01); *H01R 11/30* (2013.01); *H01R 43/24* (2013.01)

(58) Field of Classification Search
CPC .......... H01R 11/30; H01R 13/03; H01R 4/16; H01R 43/16; H01R 43/24
See application file for complete search history.

(56) References Cited

U.S. PATENT DOCUMENTS 4,676,562 A 6/1987 Adshead et al.
6,357,110 B1 * 3/2002 Shipp ....................... H01R 4/64 29/520

(Continued)

FOREIGN PATENT DOCUMENTS

EP 1810373 A2 7/2007
WO 2009027317 A2 3/2009

OTHER PUBLICATIONS

Make a Contact Microphone, by backbeats [onlain]. Instructables Circuits Jun. 27, 2015. [Found Feb. 11, 2020] http://web.archive. Org/web/20150627164342/https : //www.instructables.co /id/Make-a-Contact-M icrophone/.

*Primary Examiner* — Minh N Trinh
(74) *Attorney, Agent, or Firm* — Sisson & Banyas, Attorneys at Law, LLC; Jeffrey J. Banyas

(57) ABSTRACT

A method of manufacturing a contact element for modelling electrical circuits, in which a sheet metal blank is stamped to obtain a hollow formed workpiece (1) having an inner hollow body (2) with a bottom (3), a shoulder (4), a support platform (5) for connecting wire, said support platform having sides (7) and (8), wherein an electroplated metal coating is applied onto the hollow formed workpiece (1), said hollow formed workpiece (1) is placed in an injection mold, an outer casing (9) is formed by filling the mold with a polymer material under pressure creating the outer casing (9) on the outside of the hollow body (2), and a permanent magnet (10) is pressed into the hollow (11) of the body (2).

7 Claims, 4 Drawing Sheets

(56) References Cited

U.S. PATENT DOCUMENTS

Figure 1:
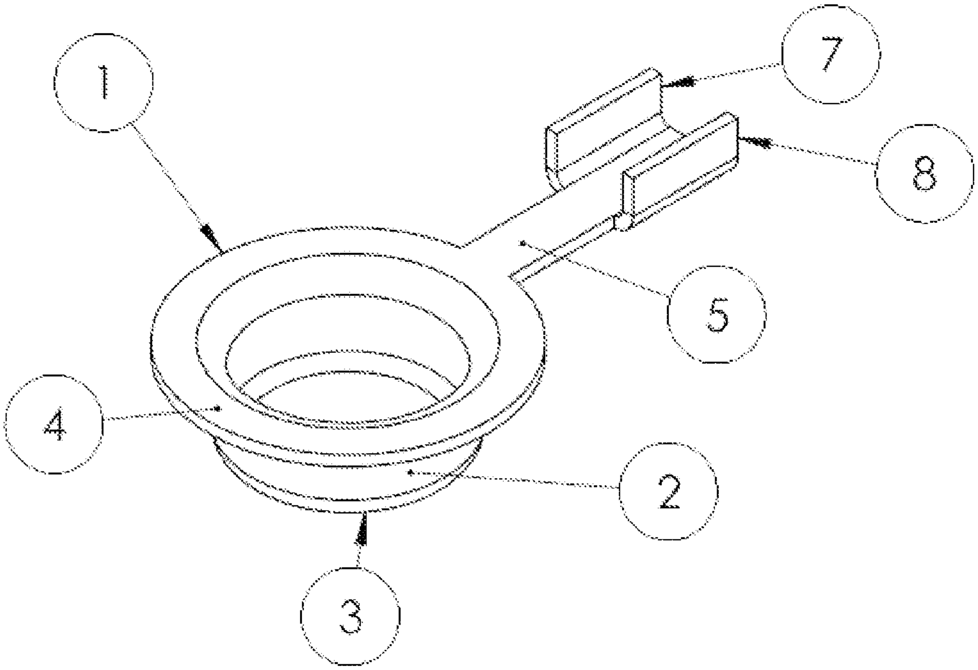

| | | | | |
|---|---|---|---|---|
| 7,658,613 | B1 | 2/2010 | Griffin et al. | |
| 11,652,304 | B2 * | 5/2023 | Parnoutsoukian | B60L 50/60 439/108 |
| 2014/0057496 | A1 | 2/2014 | Siahaan et al. | |
| 2019/0089087 | A1 | 3/2019 | Asai et al. | |
| 2022/0021171 | A1 * | 1/2022 | Tabachyn | H01R 43/24 |

* cited by examiner

METHOD OF MANUFACTURING A CONTACT ELEMENT FOR MODELLING ELECTRICAL CIRCUITS

PRIORITIES AND CROSS REFERENCES

This Application claims priority from International Application No. PCT/UA2019/000135 filed on 5 Nov. 2019 and Ukrainian Application No. U 2019 07968 filed on 12 Jul. 2019, the teachings of each of which are incorporated by reference herein in their entirety.

The invention relates to methods of manufacturing connecting elements that are used in assembling low-voltage electrical circuits with electrical and electronic components and devices, when connecting parts of construction kits having a magnetic contact surface. In particular, contact elements made by the proposed method can be used in science classes in general education and higher education institutions, courses in electrodynamics, electronics classes in school amateur radio clubs, in engineering creativity clubs, in designing and assembly of electronic circuits at home.

The prior art discloses the use of connecting cables/wires with various clamps, connectors, couplers in lab sessions and demonstration experiments in science, electrical and radio engineering classes for the purpose of electrical circuit modelling.

Patent of Ukraine No. 25954 (IPC G09B 23/18, Publication Date: Feb. 26, 1999) describes connecting wires of different lengths and different colors. At the ends, the wires can have pins or lugs intended for the electrical connection of electrically conductive connecting points installed on the sides of elements of circuit construction kits. The manufacture of such connecting wires (contact elements) is carried out by known methods. For example, metal contacts—pins or lugs—are soldered to an insulated electrical wire. As a result, such connection between the wire and the contact will not be firm (the solder joint can be easily damaged). In a contact element manufactured by such method the open end of the contact will not be completely covered, therefore, it is potentially dangerous for users (schoolchildren) when connected to a power source.

Also a disadvantage of the known connecting wires is that, when using them, assembling and disassembling electrical circuits takes a lot of time. Moreover, it is impossible to use several of such connecting wires simultaneously in one connecting point.

The aim of the invention is to develop a method for manufacturing a contact element, which, following the use of new techniques and elements, results in the creation of a completely safe magnetic contact element having a sufficiently long service life and ensuring the reliability of the contact connection, reducing the time required for electrical circuits building, providing the possibility to apply the contact to any magnetic surfaces and the possibility to simultaneously connect several wires to one terminal of a device.

The aim is achieved in that a method of manufacturing a contact element for modelling of electrical circuits is proposed; the method of manufacturing comprises the following steps:

providing a sheet metal blank;

stamping said sheet metal blank to obtain a hollow formed workpiece (1), having an inner hollow body (2) with a bottom (3), a shoulder (4), a support platform (5) for connecting wire (6), said support platform having sides (7) and (8);

providing electrical connection of the connecting wire (6) to the inner hollow body (2).

Further, according to the invention, an electroplated metal coating is applied onto the said hollow formed workpiece (1);

placing the hollow formed workpiece (1) in an injection mold;

forming an outer casing (9) by filling the mold with a polymer material under pressure creating the outer casing (9) outside the hollow body (2) with the shoulder and the support platform (5) with connecting wire (6);

pressing in a permanent magnet (10) into the hollow (11) of the body (2).

Preferably, sheet metal (1) with a thickness of 0.1-2 mm is used.

Preferably, the formed workpiece (1) is obtained having a hollow body (2) in the form of a cylinder.

Additionally, the said hollow formed workpiece (1) is coated with nickel or chromium or copper or zinc or tin or silver.

Additionally, an insulated wire is used as the connecting wire (6).

Additionally, the connection of the connecting wire (6) to the inner hollow body (2) in the form of a cylinder is provided by pressing, with simultaneous bending of the sides (7) and (8).

Preferably, a permanent magnet (10) with overall dimensions varying from 0.5 to 50 mm in height, width and length is used.

The production of a polymer outer casing around metal parts and joints leads to an increase in the workability of the product with such casing and significantly improves aesthetic and consumer properties. The invented contact element has an almost unlimited service life.

Coating the hollow formed workpiece with a thin layer of metal prevents metal corrosion which significantly extends the product's service life.

The use of a permanent magnet pressed into the hollow of the workpiece hollow body in the form of a cylinder ensures a safe electrically conductive contact, and therefore it can be recommended for use by children of any age (including preschoolers).

Building electrical circuits using the contact element manufactured according to the proposed method does not require great effort in contrast to conventional contact elements and at the same time, the proposed contact element provides a reliable electrical connection.

Figure 2:
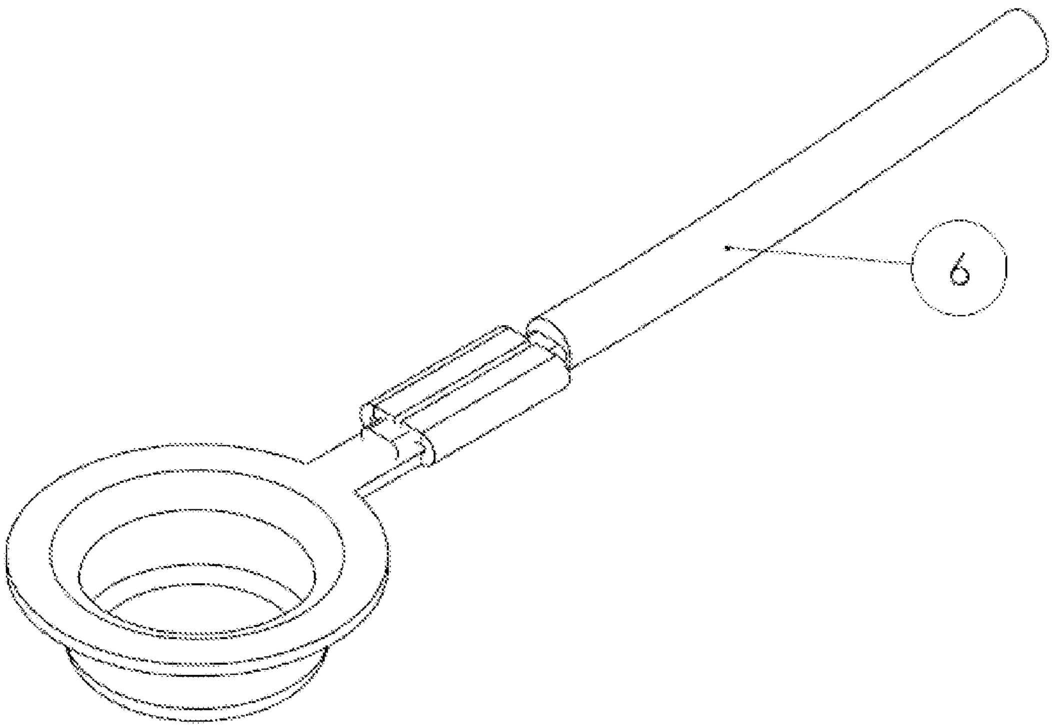
Figure 3:
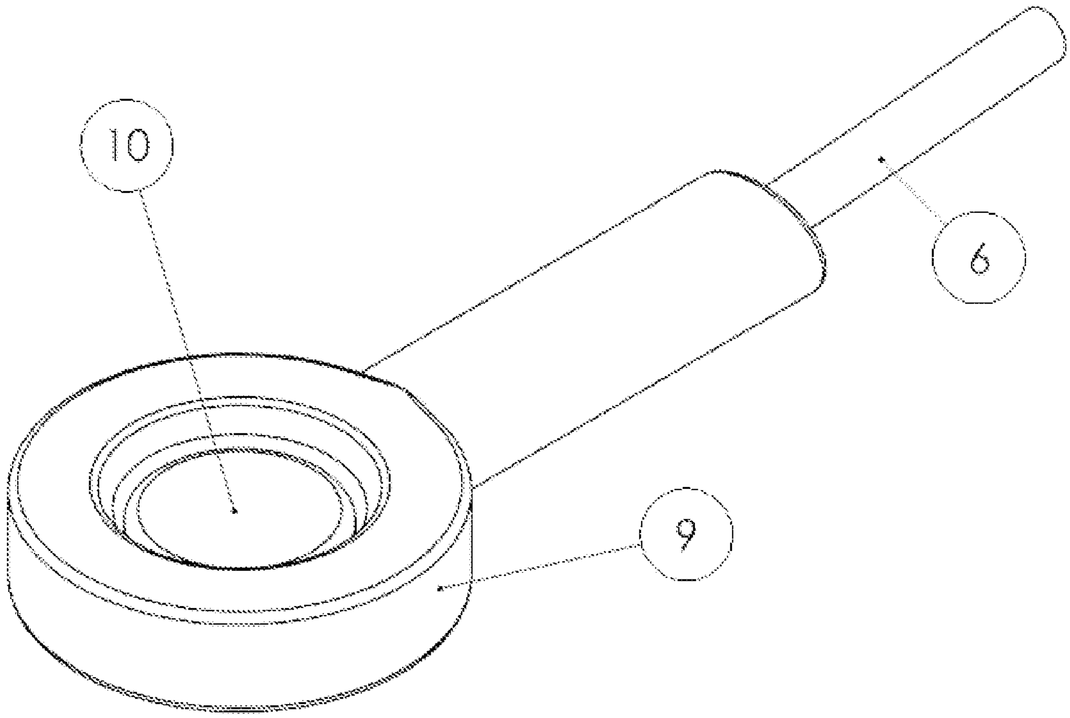
Figure 4:
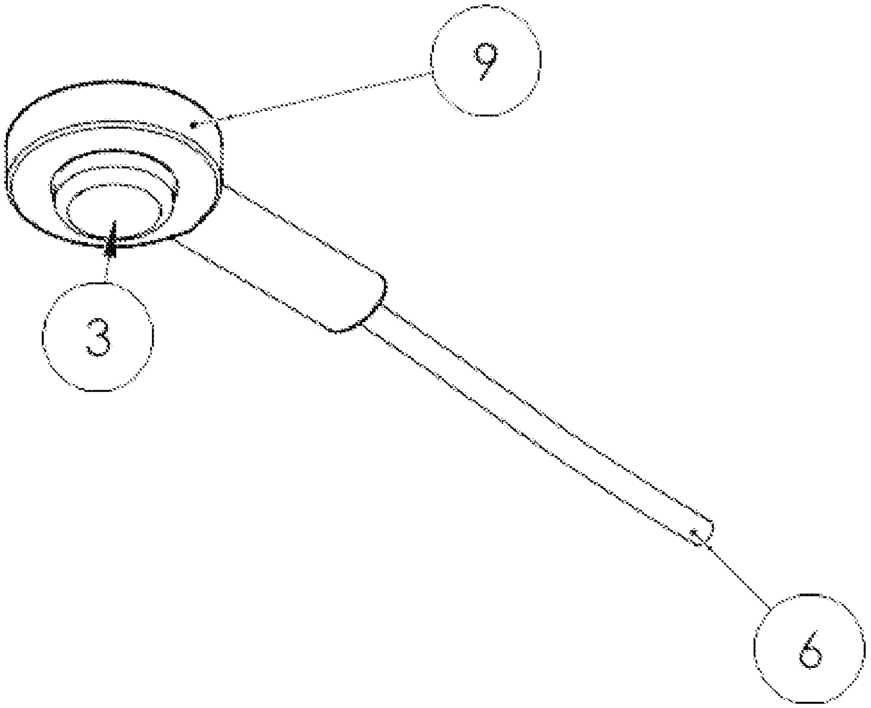

The proposed invention is illustrated by the drawings, where FIG. 1 schematically shows the formed workpiece for a contact element (general view), FIG. 2 illustrates the formed workpiece with connecting wire (general view), and FIG. 3 shows the contact element manufactured according to the proposed method (general view). FIG. 4 shows the contact element manufactured according to the proposed method (general view).

The proposed method is carried out as follows.

A workpiece to be further stamped is cut out of sheet metal, for example, with a thickness of 0.3-0.4 mm. After stamping, the workpiece 1 (as illustrated in FIG. 1) is obtained having the inner hollow body 2 shaped as a cylinder with the bottom 3 and the shoulder 4. The shoulder 4 is necessary in order to create the support platform 5; said shoulder provides a larger contact area of the workpiece metal surface with the further produced outer casing 9.

The workpiece 1 is also stamped with the support platform 5, on which the connecting wire 6 to be laid. It is clear that the connecting wire 6 will be firmly and reliably fixed on the said support platform 5 by sides 7 and 8. The connecting wire (6) can be connected to the inner hollow body 2 in the form of a cylinder by soldering the contacts 12 of the connecting wire 6 to the support platform 5 of the inner hollow body 2 in the form of a cylinder.

The workpiece 1 is further electroplated with a thin layer of, for example, nickel. Such coating prevents metal corrosion, making it possible to solder the wire to the surface, and giving it a more attractive appearance.

The workpiece 1, with the connecting wire 6 being connected to it, is further inserted into the mold installed in the injection molding machine. The mold is filled with liquid plastic and the outer casing 9 is formed, said outer casing covering the hollow body 2 in the form of a cylinder, the shoulder 4 and the support platform 5 with the connecting wire 6. This results in a finished contact element in which the bottom 3 will not be covered by the protective casing 9.

The final operation is pressing the cylindrical magnet 10 into the hollow 11 of the body 2 in the form of cylinder. For example, the permanent magnet 10 with a diameter of 5 mm and a height of 3 mm can have a pull off force of 700 grams. FIGS. 3 and 4 show the finished contact element made according to the proposed method.

The manufactured contact element has a wide range of applications. It can be used in schools for teaching during lab sessions aimed at building electrical circuits, or it can be used as part of construction kits for schoolchildren or preschoolers. The contact element is safe to use since it has no protruding sharp edges compared to known contact elements; it is easy to attach and remove, which makes it impossible to get injured when working with it, and therefore the contact element can be recommended for use by children. The contact element can be used with any magnetic surface, including surfaces with specially adapted connection points; it improves the reliability of contact connection and provides the possibility of joining several contacts in one point, allowing their rotation of 360°.

Also, the created contact element can be widely used in microelectronics for quick assembly of test circuits and connection of modules, which does not require their preliminary assembly on breadboards.

The invention claimed is:

1. A method of manufacturing a contact element for modelling of electrical circuits said method comprising steps of:

providing a sheet metal blank;

stamping said sheet metal blank to obtain a hollow formed workpiece (1), having an inner hollow body (2) with a bottom (3), a shoulder (4), a support platform (5) for connecting wire (6), said support platform having sides (7) and (8);

providing electrical connection of the connecting wire (6) to the workpiece, wherein the inner hollow body (2) and the support platform are configured to connect to the connection wire (6) by the sides (7,8), wherein applying an electroplated metal coating onto the said hollow formed workpiece (1);

placing the hollow formed workpiece (1) is placcd in an injection mold for forming an outer casing (9); forming the outer casing by filling the injection mold with a polymer material under pressure to form the outer casing (9) outside the hollow body (2) with the shoulder (4), and the support platform (5), and connecting wire (6) therefrom;

providing a permanent magnet (10) and pressing the permanent magnet onto a center hole of the body (2) of the workpiece (1) to obtain the contact element.

2. The method according to claim 1, wherein the sheet metal (1) with a thickness of 0.1-2 mm is used.

3. The method according to claim 1, wherein the hollow body (2) of the workpiece is in form of a cylinder shape.

4. The method according to claim 1, wherein the applying coating includes one of nickel or chromium or copper or zinc or tin or silver coating.

5. The method according to claim 1, wherein the connecting wire (6) is an insulated connecting wire.

6. The method according to claim 1, wherein in the connection of the connecting wire (6) to the inner hollow body (2) of the cylinder shape further comprises pressing, with simultaneous bending of the sides (7) and (8).

7. The method according to claim 1, wherein the permanent magnet (10) is 0.5 to 50 mm in height, width and length.

* * * * *